United States Patent [19]
Chen et al.

[11] Patent Number: 5,436,763
[45] Date of Patent: Jul. 25, 1995

[54] WIDE SPECTRAL BANDWIDTH VIRTUAL IMAGE DISPLAY OPTICAL SYSTEM

[75] Inventors: Chungte W. Chen, Irvine; Mao-Jin Chern, Rancho Palos Verdes, both of Calif.

[73] Assignee: Hughes Aircraft Company, Los Angeles, Calif.

[21] Appl. No.: 223,385

[22] Filed: Apr. 5, 1994

Related U.S. Application Data

[63] Continuation of Ser. No. 864,862, Apr. 7, 1992, abandoned.

[51] Int. Cl.$^6$ .................. G02B 27/10; G02B 27/42
[52] U.S. Cl. .................. 359/565; 359/558; 359/630; 345/7
[58] Field of Search .............. 340/705, 980; 359/13, 359/14, 558, 565, 566, 567, 569, 630, 631, 632, 633; 345/7, 9

[56] References Cited

U.S. PATENT DOCUMENTS

| | | | |
|---|---|---|---|
| 3,940,204 | 2/1976 | Withrington | 359/8 X |
| 4,669,810 | 6/1987 | Wood | 359/15 |
| 4,763,990 | 8/1988 | Wood | 345/7 |
| 4,927,234 | 5/1990 | Banbury et al. | 345/9 |
| 5,044,706 | 9/1991 | Chen | 359/571 X |
| 5,148,314 | 9/1992 | Chen | 359/797 X |
| 5,151,823 | 9/1992 | Chen | 359/570 X |
| 5,153,772 | 10/1992 | Kathman et al. | 359/565 X |

FOREIGN PATENT DOCUMENTS

| | | | |
|---|---|---|---|
| 8805553 | 7/1988 | WIPO | 340/705 |
| 9104508 | 4/1991 | WIPO | 340/705 |

*Primary Examiner*—William L. Sikes
*Assistant Examiner*—David R. Parsons
*Attorney, Agent, or Firm*—L. A. Alkov; W. K. Denson-Low

[57] ABSTRACT

A virtual image display optical system. The system includes an image source, a combiner, and a relay group. The relay group is a catatrioptic relay group that includes a reflective optical element, and a refractive lens group that includes at least one doublet and a diffractive lens. For some applications, the catatrioptric relay group may be replaced by a hybrid refractive-diffractive relay group, thus eliminating the reflective element. The diffractive optical element of the hybrid optical element is encoded on one side of a lens. The hybrid optical element forms a refractive/diffractive achromat to provide for primary chromatic aberration correction. The refractive lens group is also an achromat to provide for chromatic aberration correction. Power distribution between the hybrid optical element and the refractive lens group is such that secondary chromatic aberration of the refractive lens group is balanced out by the secondary chromatic aberration of the hybrid optical element. The diffractive optical element is designed using higher order wavefront correction terms encoded on one side to reduce spherochromatism and secondary spherochromatism of the relay group. One lens may have a conic or an aspherical surface to further reduce the spherochromatism and secondary spherochromatism. Asymmetrical aberration and distortion resulting from the combiner are compensated for by the reflective optical element. To minimize the residual aberration of the optical system, the reflective optical element is tilted and/or decentered. The system has a relatively wide spectral bandwidth, has good image quality, has simple optics, is ultracompact, and provides wide field coverage and large field overlaying.

18 Claims, 2 Drawing Sheets

WIDE SPECTRAL BANDWIDTH VIRTUAL IMAGE DISPLAY OPTICAL SYSTEM

CROSS REFERENCE TO RELATED APPLICATIONS

This application is a continuation of U.S. patent application Ser. No. 07/864,862, filed Apr. 7, 1992, now abandoned.

BACKGROUND

The present invention relates generally to virtual display optical systems, and more particularly, to a wide spectral bandwidth virtual image display optical system.

The prior art for virtual image display systems, such as wide spectral bandwidth head-up displays (HUD) is generally classified into two categories that include (1) systems using one combiner and an all-refractive relay, or (2) systems using one combiner and a convex reflective relay. In case (1), the secondary axial, lateral and high order chromatic aberrations severely limit the usable spectral bandwidth, eye box (pupil) size and field of view. In case (2), the generic telephoto optical form of this optical system design limits its usable field of view.

A typical conventional head-up display (HUD) or helmet-mounted display (HMD) is described in U.S. Pat. No. 3,940,204. The optical system disclosed in this patent includes three sub-modules: one holographic combiner, one relay group and one cathode my tube (CRT). The information displayed on the CRT is first relayed by a relay group to form an intermediate image and further relayed by the combiner to a comfortable position in front of a viewer. This optical design form has the following advantages. (1) The relay group allows the CRT size to be small. (2) The relay group enlarges the area of the overlay field. (3) The combiner relays the eye box (pupil) inside the relay group. Therefore, the size of the relay group is relatively small.

However, one drawback of this type of optical system is that the usable spectral bandwidth associated with the holographic combiner is very narrow. One way to correct this deficiency is to replace the holographic combiner with a reflective combiner. A second drawback associated with this type of helmet mounted display system is that the secondary axial and lateral chromatic aberration caused by the refractive relay group limits its usable spectral bandwidth.

Special glass materials such as KZFSN4 and FK52, and the like, manufactured by Schott, for example, are often used to correct secondary chromatic aberration associated with long effective focal length (EFL) optical modules. However, a typical head-up display and helmet mounted display require a low F-number, large field of view and long EFL. Therefore, higher order chromatic aberrations such as primary spherochromatism, chromatic coma and chromatic distortion, and secondary spherochromatism are present. Chromatic coma and chromatic distortion often severely degrade the image quality. In addition, the special glass materials are very expensive and are difficult to fabricate.

Furthermore, commercial and military head-up displays and automobile head-up display are normally used with monochromatic or quasi-monochromatic image generators. It appears that the majority of future display systems will desire the use of color displays. However, there is no simple conventional design form that will satisfy this requirement.

It is therefore an objective of the present invention to overcome the deficiencies inherent in conventional wide spectral bandwidth virtual image display optical systems. It is a further objective of the present invention to provide a virtual image display optical system that may be used with color image generators.

SUMMARY OF THE INVENTION

The present invention is an optical system comprising a wide spectral band-width virtual image display (VID) optical system. The virtual image display optical system comprises an image source, a combiner, and a relay group. The relay group may be comprised of a catatrioptic relay group that includes a reflective optical element, a refractive lens group that includes two lenses (doublet), and a hybrid refractive/diffractive optical element. For certain applications, the catatrioptic relay group may be replaced by a hybrid refractive-diffractive relay group. The refractive/diffractive relay group includes a group of lenses and a diffractive optical element. This eliminates the need for a reflective optical element used in the catatrioptic relay group.

The hybrid optical element includes a diffractive optical element encoded on one side of a lens. The hybrid optical element forms a refractive/diffractive achromat to provide for primary chromatic aberration correction. The doublet also comprises an achromat to provide for chromatic aberration correction. The power distribution between the hybrid optical element and the doublet is arranged such that secondary chromatic aberration of the doublet is balanced out by the secondary chromatic aberration of the hybrid optical element.

The diffractive optical element is typically designed using higher order wave-front correction terms encoded on one side thereof to reduce spherochromatism and secondary spherochromatism of the relay group. At least one of the lenses in the relay group may have a conic or an aspherical surface to further reduce the spherochromatism and secondary spherochromatism. Asymmetrical aberrations and distortion resulting from the combiner are compensated for by the reflective optical element. In order to minimize the residual aberration of the VID optical system, the reflective optical element is tilted and/or decentered.

Compared with prior art VID systems, the optical system in accordance with the present invention has much wider spectral bandwidth coverage, has better image quality, has simpler optics, is ultracompact, and provides wide field coverage and very large field overlaying. The present invention is also relatively inexpensive.

In the present invention, a new class of relay groups, comprising a refractive sub-group with at least two lenses and a diffractive optical element, provides excellent image quality over a very, wide field of view. The present optical system has excellent primary and secondary chromatic aberration corrections. It may also be configured in a very compact package, and its design form is very simple and is potentially very inexpensive.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
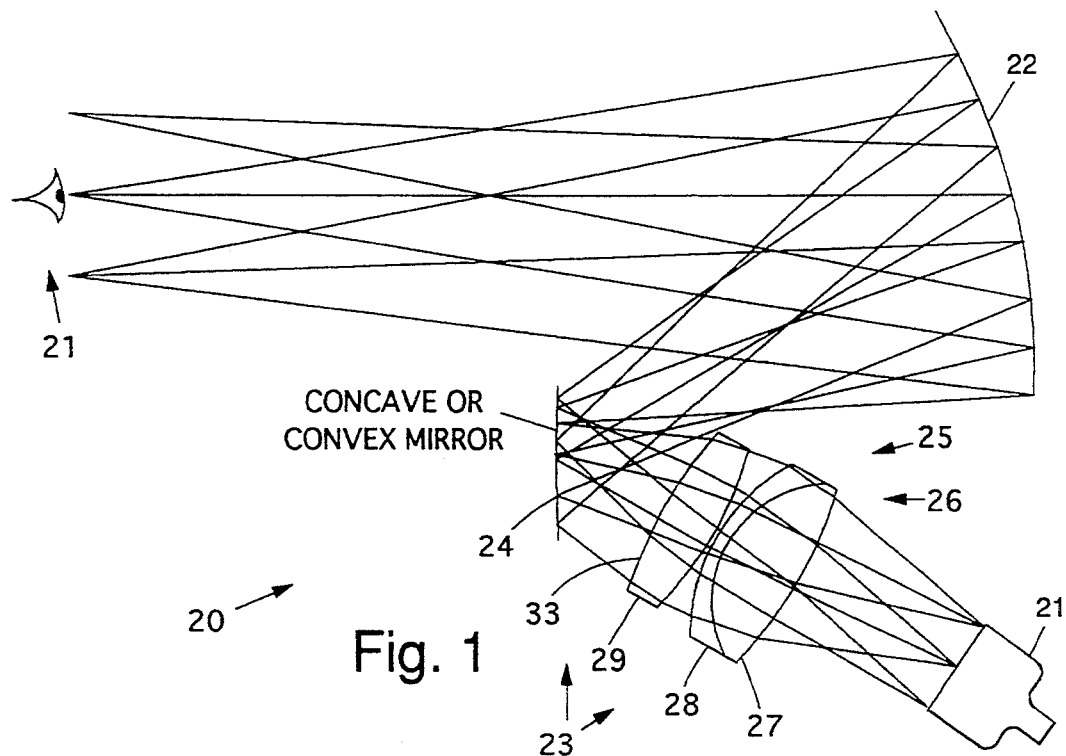
FIGS. 1 and 2 are side and top views, respectively, of a virtual image display optical system in accordance with the principles of the present invention.
Figure 2:
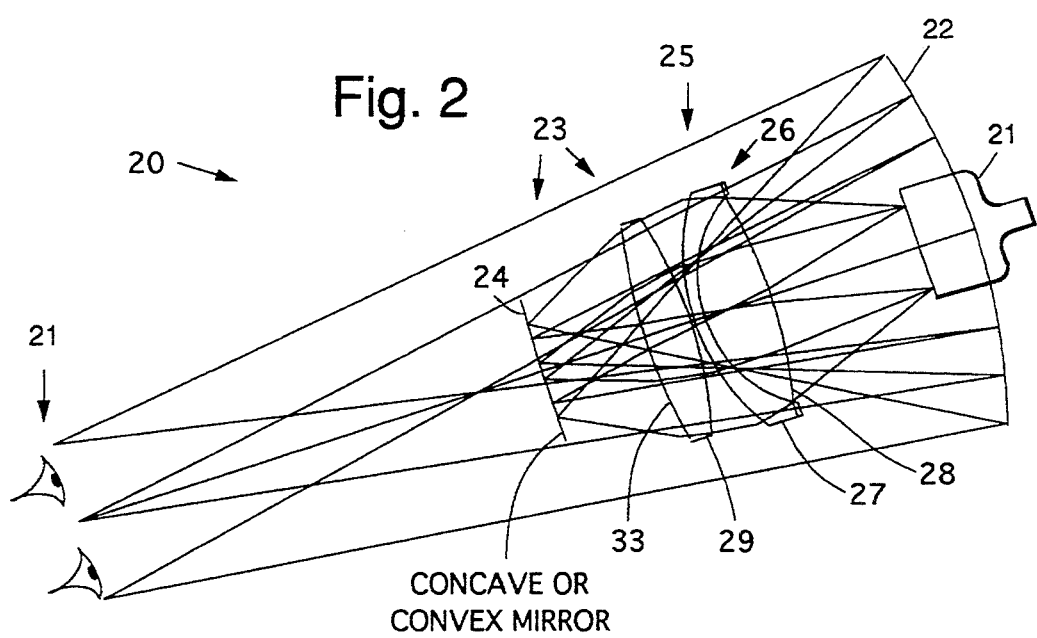

Referring to the drawing figures, FIGS. 1 and 2 show side and top views, respectively, of a ritual image display optical system 20 in accordance with the principles of the present invention. The virtual image display optical system 20 comprises an image source 21, such as a cathode ray tube (CRT), a combiner 22, and a relay lens group 23. The optical system 20 thus comprises two sub-modules including the combiner 22 and the relay lens group 23. In the system 20 of FIGS. 1 and 2, the relay lens group 23 (catatrioptric relay group 23) comprises a reflective optical element 24 (reflecting concave mirror 24), and a refractive lens group 25 that includes a refractive doublet 26 comprising two lenses 27, 28 and a hybrid optical element 29 (lens 29). The specific characteristics of relevant ones of the optical components of the system 20 will be described in detail below.

In operation, information displayed on the image some 21 (CRT 21) passes through the relay lens group 23, which comprises the doublet 26 and the hybrid optical element 29, and is re-imaged by the reflective element 24 (the concave mirror 24) at an intermediate image plane. The combiner 21 relays the image from the intermediate image plane to a comfortable viewing distance in front of the eyes 31 of an operator 30. The design principles for the catatrioptric relay group 23 are summarized below:

(1) Asymmetrical aberration and distortion resulting from the combiner 21 are compensated for by the reflective optical element 24 (concave mirror 24). In order to minimize the residual aberration of the overall optical system 20, the concave mirror 24 may be tiled and/or decentered. The need for tilt or decentering is determined using conventional optical analysis programs.

(2) The hybrid optical element 29 (lens 29) comprises a diffractive optical element that is encoded on one side and forms a refractive-diffractive achromat or near an achromat to provided for primary chromatic aberration correction. The encoding necessary to properly form the refractive-diffractive achromat is achieved using conventional optical analysis programs.

(3) The doublet 26 is also fabricated as an achromat or near an achromat to correct for primary chromatic aberration in conjunction with the hybrid optical element 29.

(4) Secondary chromatic aberration due to the doublet 26 is balanced out by the secondary chromatic aberration of the hybrid optical element 29.

(5) Spherochromatism and secondary spherochromatism are balanced out by encoded higher order wavefront information such as $\rho^4$, $\rho^6$ or higher terms encoded onto the hybrid optical element 29. In many cases, higher order residual chromatic aberration can be further reduced when at least one of the lenses 27, 28, 29 of the relay lens group 23 has a conic or aspherical surface. In FIG. 1, one surface 33 of the hybrid optical element 29 is an aspherical surface.

(6) The design procedures outlined in paragraph numbers (2) to (5) also automatically minimize asymmetric chromatic aberrations such as primary and secondary lateral color, chromatic coma and chromatic distortion caused by the optical elements of the system 20.

In addition, the diffractive optical element may comprise a kinoform-type diffractive surface to provide for high diffraction efficiency, or more particularly, a binary optical surface having $2^n$ steps that emulates a kinoform grating surface. Furthermore, depending upon the application, the mirror 24 may be concave to provide wide field coverage, or convex to provide magnification.

The virtual image display optical system 20 constructed according to the teachings of the present invention has improved image quality, relatively simple optical elements, is relatively compact, provides wide field coverage, and provides excellent chromatic aberration correction. In addition, the residual chromatic aberration across the system's spectral band is very small.

FIGS. 1 and 2 show the side and top views of a design example constructed according to the teachings of the present invention described above. Table 1 summarizes a detailed prescription of the optical system. It has wide spectral band coverage with a wide field, has very large field overlaping and is very compact. The residual chromatic aberration across the entire spectral band is very small.

TABLE 1

| Element | Radius (in) | Conic constant | Decenter (in) | Tilt (deg), | Thickness |
|---|---|---|---|---|---|
| Combiner | −14.7867 | −4.4317 | 0 | 15.0 | −12.55501 |
| | $C_5 = -0.207811E-2$ | $C_8 = 0.40700E-3$ | | $C_{10} = 0.161392E-44$ | |
| | $C_{11} = -0.570015E-4$ | $C_{12} = 0.375767E-5$ | | $C_{14} = -0.373330E-6$ | |
| | $C_{17} = -0.124571E-5$ | $C_{19} = 0.254268E-6$ | | $C_{21} = 0.160307E-6$ | |
| | $C_{22} = 0.253730E-6$ | | | | |

| Element | Radius (in) | Conic constant | Decenter (in) | Tilt (deg) | Thickness |
|---|---|---|---|---|---|
| Relay minor | 40.8679 | −550.78 | 0 | −30.0 | 2.835 |
| | $C_5 = 0.781415E-3$ | $C_8 = 0.169647E-3$ | | $C_{10} = 0.170825E-3$ | |
| | $C_{11} = 0.169583E-3$ | $C_{12} = -0.244154E-3$ | | $C_{14} = =0.114474E-4$ | |
| | $C_{17} = 0.254529E-4$ | $C_{19} = -0.392984E-4$ | | $C_{21} = -0.349554E-4$ | |
| | $C_{22} = -0.600655E-4$ | | | | |

| Element | Glass type | Radius of Curvature Front/back | Decenter (in) | Thickness | Aperture diameter Front/back (in) |
|---|---|---|---|---|---|
| Refractive | plastic | 8.75637/ | 0.315 | 1.35 | 5.4/5.4 |

TABLE 1-continued

| element | plexiglass | −8.32869 |
| --- | --- | --- |
| | | Conic constant = −16.177 |
| | Diffractive element | on the back surface of the refractive element $f(\rho) = 213.300\rho^2$ |

| Element | Glass type | Radius of Curvature Front/back | Decenter (in) | Thickness | Aperture diameter Front/back (in) |
| --- | --- | --- | --- | --- | --- |
| Refractive element | Schott F2 | 4.60832/ 2.85118 | 0 | 0.300 | 5.8/5.2 |
| Refractive element | Schott Bk7 | 2.85118/ −10.0335 | 0 | 1.900 | 5.2/5.2 |

The Zernike polynomials $$Z(x,y) = \sum_{i=1}^{24} C_i Z_i(x,y)$$

describe an additional surface sag deviated from a conic surface. The non-zero Zernike polynomial terms are listed below.

$Z_5(x,y) = x^2 - y^2$
$Z_8(x,y) = y(x^2 + y^2)$
$Z_{10}(x,y) = y(3x^2 - y^2)$
$Z_{11}(x,y) = (x^2 + y^2)^2$
$Z_{12}(x,y) = x^4 - y^4$
$Z_{14}(x,y) = x^4 - 6x^2 + y^4$
$Z_{17}(x,y) = y(x^2 + y^2)^2$
$Z_{19}(x,y) = 3x^4y + 2x^2y^3 - y^5$
$Z_{21}(x,y) = 5x^4y - 10x^2y^3 + y^5$
$Z_{22}(x,y) = (x^2 + y^2)^3$ where y and x are aperture coordinates of an optical surface in meridional and sagittal planes, respectively; $f(\rho)$ is the grating phase equation of this diffractive optical element—the nth grating ring boundary is located where $\rho$ satisfies $f(\rho) = n$; $\rho$ is the radial coordinate; (+) radii have centers to the right; (−) radii have centers to the left; (+) thickness to the right; (+) decenters are up; (+) tilts are counterclockwise and in degrees; decenters are performed before tilts; conic constant $-\epsilon^2 = -(\text{eccentricity})^2$; dimensions are given in inches; reference wavelength=0.58765 μm; spectral range=0.17 μm.

Figure 3:
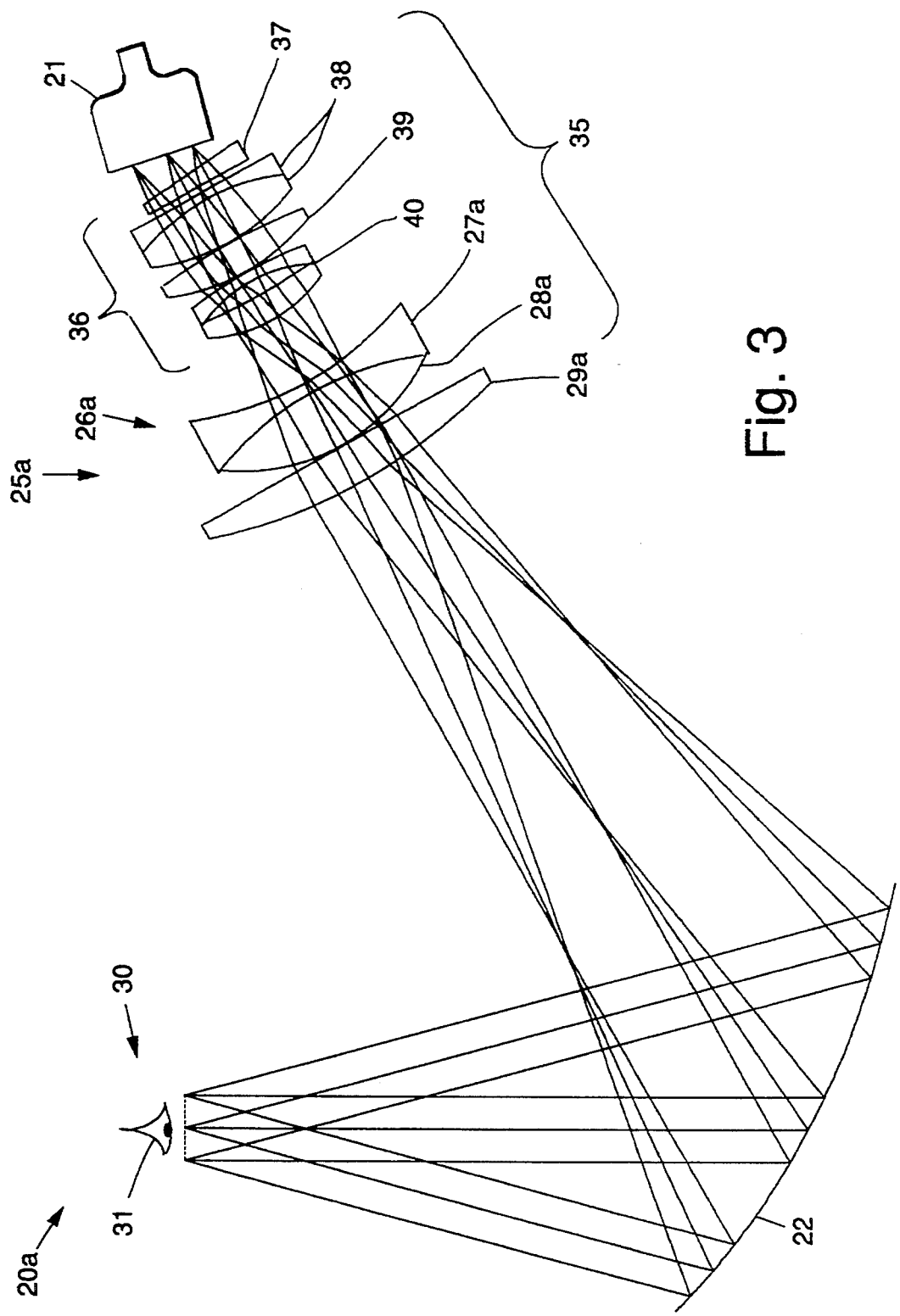
FIG. 3 is a side view of a second embodiment of a virtual image display optical system in accordance with the principles of the present invention that eliminates the reflective optical element employed in the system of FIGS. 2 and 3.

With reference to FIG. 3, in some applications, the catatrioptic relay group 23 may not require the use of the reflective optical element 24. FIG. 3 is a side view of the second embodiment of a virtual image display optical system 20a in accordance with the principles of the present invention. This second embodiment does not incorporate the reflective optical element 24 employed in the system 20 of FIGS. 1 and 2. The catatrioptic relay group 23 is replaced by a hybrid refractive-diffractive lens group 35.

More specifically, the virtual image display optical system 20a comprises the image source 21, the combiner 22, and the hybrid refractive-diffractive lens group 35. The hybrid refractive-diffractive lens group 35 comprises a first refractive lens group 36, and a second refractive lens group 25a. The first refractive lens group 36 comprises a wedge or prism 37, a doublet 38, a refractive lens 39 and a triplet 40. The second refractive lens group 25a includes a refractive doublet 26a (comprising lenses 27a, 28a) and a hybrid refractive/diffractive optical element 29a. The focal lengths and radii of curvature for each of the lenses 27a, 28a, 29a are adjusted accordingly to provide a proper image for the combiner 22.

Thus there has been described a new and improved wide spectral bandwidth virtual image display optical system wherein chromatic aberration and distortion is minimized to provide improved image quality. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A virtual image display optical system comprising:
    an image source;
    a combiner; and
    a catatrioptric relay group disposed between the image source and the combiner, wherein said catatrioptic relay group comprises (i) a reflective optical element, (ii) a refractive lens group including a doublet, and a (iii) second relay group comprising a lens and a diffractive optical element disposed between the reflective optical element and the refractive lens group.

2. The virtual image display optical system of claim 1 wherein the reflective optical element is concave to provide wide field coverage.

3. The virtual image display optical system of claim 1 wherein the reflective optical element is convex to provide magnification.

4. The virtual image display optical system of claim 1 wherein the catatrioptic relay group comprises a hybrid optical element that forms a refractive/diffractive achromat to provide for primary chromatic aberration correction.

5. The virtual image display optical system of claim 1 wherein the refractive lens group comprises an achromat to correct for primary chromatic aberration.

6. The virtual image display optical system of claim 5 wherein at least one of the lenses has an aspherical surface to further reduce the spherochromatism and secondary spherochromatism.

7. The virtual image display optical system of claim 1 wherein power distribution between the relay group and the refractive lens group of said catatrioptic relay group is arranged such that secondary chromatic aberration of the refractive lens group of said catatrioptic relay group is balanced out by the secondary chromatic aberration of the relay group.

8. The virtual image display optical system of claim 1 wherein the diffractive optical element is designed using higher order wavefront correction terms to reduce spherochromatism and secondary spherochromatism of the relay group.

9. The virtual image display optical system of claim 8 wherein at least one of the lenses has a conic surface to further reduce the spherochromatism and secondary spherochromatism.

10. The virtual image display optical system of claim 1 wherein the diffractive optical element comprises a kinoform-type diffractive surface to provide for high diffraction efficiency.

11. The virtual image display optical system of claim 1 wherein the diffractive optical element comprises a binary optical surface having $2^n$ steps that emulates a kinoform grating surface.

12. A virtual image display optical system comprising:
   an image source;
   a combiner; and
   a refractive-diffractive relay group disposed between the image source and the combiner comprising:
   (i) a lens,
   (ii) a diffractive optical element disposed adjacent to the lens, and
   (iii) a refractive lens group including at least one doublet disposed adjacent to the diffractive optical element and distal from the lens.

13. The virtual image display optical system of claim 12 wherein the relay group comprises a hybrid optical element that forms a refractive-diffractive achromat to provide for primary chromatic aberration correction.

14. The virtual image display optical system of claim 12 wherein the refractive lens group substantially comprises an achromat to correct the primary chromatic aberration.

15. The virtual image display optical system of claim 12 wherein power distribution between the relay group and the refractive lens group is arranged such that secondary chromatic aberration of the refractive lens group is balanced out by the secondary chromatic aberration of the relay group.

16. The virtual image display optical system of claim 12 wherein the diffractive optical element is designed using higher order wavefront correction terms to reduce spherochromatism and secondary spherochromatism of the relay group.

17. The virtual image display optical system of claim 16 wherein at least one of the lenses has a conic surface to further reduce the spherochromatism and secondary spherochromatism.

18. The virtual image display optical system of claim 16 wherein at least one of the lenses has an aspherical surface to further reduce the spherochromatism and secondary spherochromatism.

* * * * *